US012456851B2

United States Patent
Chinsoga et al.

(10) Patent No.: US 12,456,851 B2
(45) Date of Patent: Oct. 28, 2025

(54) GAS-INSULATED SWITCHING DEVICE USING C3HClF4 OR C4H2F6

(71) Applicant: AGC INC., Tokyo (JP)

(72) Inventors: Tamaki Chinsoga, Chiyoda-ku (JP); Masato Fukushima, Chiyoda-ku (JP); Hiroki Hayamizu, Chiyoda-ku (JP)

(73) Assignee: AGC INC., Tokyo (JP)

( * ) Notice: Subject to any disclaimer, the term of this patent is extended or adjusted under 35 U.S.C. 154(b) by 264 days.

(21) Appl. No.: 18/295,922

(22) Filed: Apr. 5, 2023

(65) Prior Publication Data

US 2023/0261446 A1  Aug. 17, 2023

Related U.S. Application Data

(63) Continuation of application No. PCT/JP2021/037954, filed on Oct. 13, 2021.

(30) Foreign Application Priority Data

Oct. 22, 2020 (JP) ................... 2020-177310

(51) Int. Cl.
  *H02B 13/055*  (2006.01)
(52) U.S. Cl.
  CPC ................... *H02B 13/055* (2013.01)
(58) Field of Classification Search
  None
  See application file for complete search history.

(56) References Cited

U.S. PATENT DOCUMENTS

| | | | | |
|---|---|---|---|---|
| 3,185,734 A | * | 5/1965 | Fawcett | C07C 45/00 568/381 |
| 4,052,555 A | * | 10/1977 | Mears | H01B 3/16 252/372 |
| 4,175,048 A | * | 11/1979 | Christophorou | H02B 13/055 252/571 |
| 4,257,905 A | * | 3/1981 | Christophorou | H02B 13/055 313/589 |
| 4,275,260 A | * | 6/1981 | Wootton | H01B 3/56 174/31 R |
| 4,288,651 A | * | 9/1981 | Wootton | H01H 33/22 174/31 R |

(Continued)

FOREIGN PATENT DOCUMENTS

| | | |
|---|---|---|
| CN | 111211515 A | 5/2020 |
| FR | 3 079 359 A1 | 9/2019 |

(Continued)

OTHER PUBLICATIONS

Original and Translation of FR2989374 (Year: 2013).*
International Search Report issued Dec. 7, 2021 in PCT/JP2021/037954 filed on Oct. 13, 2021, 2 pages.

*Primary Examiner* — Timothy J. Dole
*Assistant Examiner* — Muhammed Azam
(74) *Attorney, Agent, or Firm* — Oblon, McClelland, Maier &Neustadt, L.L.P.

(57) ABSTRACT

An electric facility includes: a metal tank in which a conductor member is disposed, the metal tank being filled with a dielectric, in which the dielectric contains at least one selected from the group consisting of 1-chloro-2,3,3,3-tetrafluoropropene and 1,1,1,4,4,4-hexafluoro-2-butene; and a surface of the conductor member includes one or more selected from the group consisting of a metal and a metal oxide.

17 Claims, 1 Drawing Sheet

(56) References Cited

U.S. PATENT DOCUMENTS

| | | | | |
|---|---|---|---|---|
| 4,440,971 A * | 4/1984 | Harrold | H01B 3/16 | 252/570 |
| 4,565,901 A * | 1/1986 | Hirooka | H02B 13/055 | 252/372 |
| 5,146,019 A * | 9/1992 | Bielefeldt | C07C 17/08 | 570/160 |
| 5,463,150 A * | 10/1995 | Lui | C07C 17/25 | 570/155 |
| 5,558,810 A * | 9/1996 | Minor | C09K 5/045 | 516/8 |
| 5,998,671 A * | 12/1999 | Van Der Puy | C07C 45/54 | 568/403 |
| 6,063,997 A * | 5/2000 | Endo | H02B 13/065 | 174/26 G |
| 6,444,937 B1 * | 9/2002 | Piazza | H01H 33/22 | 218/43 |
| 7,074,343 B2 * | 7/2006 | Minor | C09K 5/045 | 524/463 |
| 7,807,074 B2 * | 10/2010 | Luly | H01B 3/56 | 252/571 |
| 7,825,081 B2 * | 11/2010 | Singh | C09K 23/017 | |
| 7,923,630 B2 * | 4/2011 | Richardson | H01B 3/56 | 174/15.1 |
| 8,436,216 B2 * | 5/2013 | Sun | C07C 17/269 | 570/156 |
| 8,461,401 B2 * | 6/2013 | Tung | C07C 17/278 | 570/171 |
| 8,522,817 B1 * | 9/2013 | Jordan | F17C 3/00 | 137/565.17 |
| 8,680,037 B2 * | 3/2014 | Robin | C11D 7/5054 | 510/415 |
| 8,709,303 B2 * | 4/2014 | Mahdizadeh | H02B 1/21 | 252/573 |
| 8,748,770 B2 * | 6/2014 | Nakayama | H02B 13/0354 | 218/78 |
| 8,926,856 B2 * | 1/2015 | Low | G06Q 30/018 | 521/131 |
| 8,961,808 B2 * | 2/2015 | Robin | A62D 1/0057 | 252/364 |
| 9,085,721 B2 * | 7/2015 | Robin | C09K 3/30 | |
| 9,175,202 B2 * | 11/2015 | Low | C09K 5/045 | |
| 9,257,213 B2 * | 2/2016 | Ingold | H01B 3/56 | |
| 9,349,501 B2 * | 5/2016 | Miyamoto | H01H 33/64 | |
| 9,355,792 B2 * | 5/2016 | Yoshida | H02B 13/0354 | |
| 9,412,541 B2 * | 8/2016 | Pisu | H01H 33/60 | |
| 9,491,877 B2 * | 11/2016 | Kieffel | H05K 5/06 | |
| 9,502,868 B2 * | 11/2016 | Kagawa | H02B 13/0352 | |
| 9,837,801 B2 * | 12/2017 | Kieffel | H01F 38/20 | |
| 9,944,839 B2 * | 4/2018 | Schultz | C09K 5/045 | |
| 10,077,330 B2 * | 9/2018 | Van Der Puy | C08J 9/02 | |
| 10,096,979 B2 * | 10/2018 | Yoshimura | H02G 5/065 | |
| 10,266,665 B2 * | 4/2019 | Kontomaris | C09K 5/045 | |
| 10,297,987 B2 * | 5/2019 | Yoshida | H02B 13/0354 | |
| 10,407,603 B2 * | 9/2019 | Rached | C11D 7/5054 | |
| 10,487,031 B2 * | 11/2019 | Peng | C07C 19/12 | |
| 10,529,510 B2 * | 1/2020 | Hyrenbach | H01H 33/56 | |
| 10,573,426 B2 * | 2/2020 | Costello | H01B 3/56 | |
| 10,607,748 B2 * | 3/2020 | Izcara Zurro | H01H 33/22 | |
| 10,630,061 B2 * | 4/2020 | Kramer | G01N 21/33 | |
| 10,851,303 B2 * | 12/2020 | Knapp | C09K 3/14 | |
| 11,070,039 B2 * | 7/2021 | Furui | H02B 13/045 | |
| 11,311,761 B2 * | 4/2022 | Robin | C08J 9/144 | |
| 11,450,448 B2 * | 9/2022 | Doiron | H01B 3/427 | |
| 11,739,243 B2 * | 8/2023 | Stewart | C11D 7/5022 | 252/67 |
| 12,054,596 B2 * | 8/2024 | Yu | C08J 9/125 | |
| 2002/0060204 A1 * | 5/2002 | Tohya | H02B 13/055 | 218/155 |
| 2009/0109604 A1 * | 4/2009 | Yanabu | H01B 3/56 | 361/618 |
| 2011/0001080 A1 * | 1/2011 | Van Horn | C09K 5/044 | 570/135 |
| 2011/0101264 A1 * | 5/2011 | Knapp | C01B 7/196 | 570/178 |
| 2011/0147638 A1 * | 6/2011 | Robin | C09K 5/045 | 51/293 |
| 2012/0085735 A1 * | 4/2012 | Uchii | H02B 13/055 | 218/68 |
| 2012/0117990 A1 * | 5/2012 | Rached | C09K 5/045 | 62/115 |
| 2012/0138847 A1 * | 6/2012 | Van Horn | C09K 5/045 | 516/8 |
| 2012/0145521 A1 * | 6/2012 | Glasmacher | H02B 13/055 | 568/419 |
| 2012/0309824 A1 * | 12/2012 | Robin | A61L 2/206 | 516/8 |
| 2013/0255284 A1 * | 10/2013 | Rached | F25B 29/003 | 62/238.7 |
| 2013/0265692 A1 * | 10/2013 | Mahdizadeh | H02B 1/50 | 568/683 |
| 2013/0277334 A1 * | 10/2013 | Mantilla | H01H 33/22 | 252/571 |
| 2013/0292599 A1 * | 11/2013 | Robin | C09K 3/30 | 252/570 |
| 2013/0292614 A1 * | 11/2013 | Tuma | H01B 3/56 | 252/571 |
| 2014/0305667 A1 * | 10/2014 | Robin | C11D 7/5054 | 252/364 |
| 2014/0346145 A1 * | 11/2014 | Piccoz | H01H 33/562 | 218/90 |
| 2015/0014606 A1 * | 1/2015 | Robin | A62D 1/0057 | 516/8 |
| 2015/0191576 A1 * | 7/2015 | Robin | H01B 3/24 | 252/570 |
| 2015/0202480 A1 * | 7/2015 | Robin | C11D 7/505 | 252/570 |
| 2016/0311961 A1 * | 10/2016 | Klostermann | C08G 18/18 | |
| 2016/0369147 A1 * | 12/2016 | Fukushima | C09K 5/04 | |
| 2017/0213673 A1 * | 7/2017 | Elshani | H01H 33/56 | |
| 2018/0141893 A1 | 5/2018 | Lamanna et al. | | |
| 2018/0264303 A1 | 9/2018 | Robin et al. | | |
| 2018/0273755 A1 * | 9/2018 | Cobb | B32B 15/20 | |
| 2019/0027268 A1 * | 1/2019 | Doiron | H01B 3/427 | |
| 2020/0230454 A1 | 7/2020 | Robin et al. | | |
| 2020/0365353 A1 | 11/2020 | Rached | | |
| 2023/0037700 A1 * | 2/2023 | Hayamizu | C08L 27/12 | |
| 2023/0261446 A1 * | 8/2023 | Chinsoga | H01B 3/56 | 174/17 GF |
| 2023/0323177 A1 * | 10/2023 | Chinsoga | C09K 3/30 | |
| 2023/0326693 A1 * | 10/2023 | Hayamizu | H01H 33/22 | 218/1 |
| 2024/0150683 A1 * | 5/2024 | Kawaguchi | B05D 3/046 | |
| 2024/0318060 A1 * | 9/2024 | Hayamizu | C09K 5/04 | |

FOREIGN PATENT DOCUMENTS

| | | |
|---|---|---|
| JP | 2018-525327 A | 9/2018 |
| JP | 2020-514493 A | 5/2020 |
| WO | WO 2019/036049 A1 | 2/2019 |
| WO | WO 2019/242977 A1 | 12/2019 |

* cited by examiner

GAS-INSULATED SWITCHING DEVICE USING C3HClF4 OR C4H2F6

CROSS-REFERENCE TO RELATED APPLICATIONS

This application is a Continuation of International Application No. PCT/JP2021/037954, filed on Oct. 13, 2021, which claims priority to Japanese Patent Application No. 2020-177310, filed on Oct. 22, 2020. The entire disclosure of each of the above applications is incorporated herein by reference.

TECHNICAL FIELD

The present invention relates to an electric facility.

BACKGROUND ART

In an electric facility such as a gas-insulated switching device, a conductor to which a high voltage is applied is housed in a metal tank, and the tank is filled with a dielectric as an insulating gas, thereby ensuring insulation performance.

Conventionally, for example, $SF_6$ has been known as a dielectric used for such electric facility. However, $SF_6$ has high insulation performance but a large global warming potential (GWP). Therefore, from the viewpoint of reducing the environmental load, the use of hydrofluoroolefin (hereinafter, also referred to as HFO) or hydrochlorofluoroolefin (hereinafter, also referred to as HCFO) has been studied as a dielectric substituted for $SF_6$. Patent Document 1 describes that a dielectric containing HFO is useful for electrical insulation.

RELATED ART DOCUMENTS

Patent Documents

Patent Document 1: Japanese Patent Application Laid-Open (JP-A) No. 2018-525327

SUMMARY OF INVENTION

Technical Problem

In HFO and HCFO having geometric isomers, an isomerization reaction proceeds depending on the temperature condition and coexisting metals. Geometric isomers often have different boiling points. When the isomerization of the dielectric progresses in the electric facility and the boiling point of the dielectric changes, the insulation performance of the electric facility may be deteriorated.

For example, when the boiling point of the dielectric increases due to the isomerization of the dielectric, the condensation temperature of the dielectric increases, and the dielectric may be liquefied in the tank, leading to deterioration of the insulation performance.

In addition, when the boiling point of the dielectric decreases due to the isomerization of the dielectric, the pressure in the tank increases, and thus there is a concern in terms of safety in designing the device.

The present disclosure has been made in view of the above problems, and an object of the present disclosure is to provide an electric facility in which isomerization of a dielectric used as an insulating gas is suppressed.

Solution to Problem

The disclosure includes the following [1] to [6].

[1] An electric facility including:
a metal tank in which a conductor member is disposed, the metal tank being filled with a dielectric, in which
the dielectric contains at least one selected from the group consisting of 1-chloro-2,3,3,3-tetrafluoropropene and 1,1,1,4,4,4-hexafluoro-2-butene; and
a surface of the conductor member includes one or more selected from the group consisting of a metal and a metal oxide.

[2] The electric facility according to [1], in which the metal is a metal selected from the group consisting of aluminum, copper, silver, tin, zinc, iron, and chromium, or is an alloy including at least one selected from the group consisting of aluminum, copper, silver, tin, zinc, iron, and chromium.

[3] The electric facility according to [1] or [2], in which the dielectric includes at least one selected from the group consisting of a Z-isomer and an E-isomer of 1-chloro-2,3,3-tetrafluoropropene, and a Z-isomer and an E-isomer of 1,1,1,4,4,4-hexafluoro-2-butene.

[4] The electric facility according to any one of [1] to [3], in which the dielectric includes a Z-isomer and an E-isomer of 1-chloro-2, 3, 3, 3-tetrafluoropropene, and a mass ratio represented by the Z-isomer/the E-isomer in a total mass of the 1-chloro-2, 3, 3, 3-tetrafluoropropene is from 99/1 to 50/50.

[5] The electric facility according to any one of [1] to [4], further including:
a device selected from the group consisting of a switch, a breaker, a disconnector, a transformer, a resistor, a reactor, a capacitor and an insulated cable.

[6] An electric facility including:
a metal tank in which a conductor member is disposed, the metal tank being filled with a dielectric, in which
the dielectric includes at least one selected from the group consisting of 1-chloro-2, 3, 3, 3-tetrafluoropropene and 1,1,1,4,4,4-hexafluoro-2-butene, and
a change amount $\Delta Z$ of a peak area of a Z-isomer contained in the dielectric from an initial value and a change amount $\Delta E$ of a peak area of an E-isomer contained in the dielectric from an initial value, which are measured by a gas chromatograph after a lapse of 1008 hours under a temperature condition of 160° C., satisfy the following Formulae 1 and 2:

$-1.0$ area $\% \leq \Delta Z \leq 1.0$ area %      Formula 1:

$-1.0$ area $\% \leq \Delta E \leq 1.0$ area %.      Formula 2:

Advantageous Effects of Invention

According to the present disclosure, an electric facility in which isomerization of a dielectric used as an insulating gas is suppressed can be provided.

DESCRIPTION OF EMBODIMENTS

Hereinafter, an electric facility of the present disclosure will be described with reference to the drawings.

Figure 1:
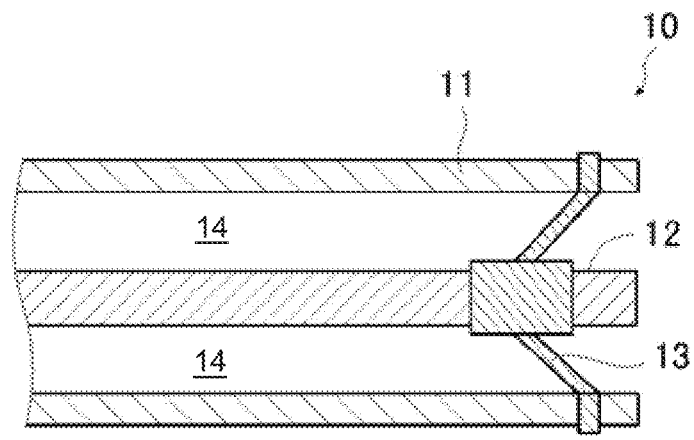
FIG. 1 is a cross-sectional view illustrating a configuration example of an electric facility of the present disclosure.

FIG. 1 is a cross-sectional view illustrating a configuration example of the electric facility of the present disclosure. In FIG. 1, a gas-insulated switching device 10 is illustrated as an example of a gas electric facility.

An electric facility 10 illustrated in FIG. 1 includes a metal tank 11 in which a conductor member 12 is disposed. The metal tank 11 is filled with a dielectric 14 as an insulating gas.

In FIG. 1, the conductor member 12 is supported by a support member 13 in a state of being insulated from the metal tank 11. The metal tank 11 is an airtight container, space, or the like. A high voltage is applied to the conductor member 12.

Here, the surface of the conductor member 12 includes one or more selected from the group consisting of metals and metal oxides.

As the metal, a metal selected from the group consisting of aluminum, copper, silver, tin, zinc, iron, and chromium, or an alloy containing at least one selected from the group consisting of aluminum, copper, silver, tin, zinc, iron, and chromium is preferable.

The metal oxide may be an oxide obtained by oxidizing the above-mentioned metal or an oxide of another metal. The metal oxide is preferably one or more selected from the group consisting of zinc oxide, iron oxide, and aluminum oxide.

The conductor member may be made of a plurality of materials. In particular, a core portion (the inside of the conductor member) may be made of a material other than a metal and a metal oxide. When the core portion of the conductor member is made of another material, at least a part of the surface of the conductor member is covered with one or more selected from the group consisting of metals and metal oxides.

From the viewpoint of suppressing isomerization of the dielectric, it is preferred that, in the surface of the conductor member, at least a part of the portion in contact with the dielectric filled in the metal tank 11 is one or more selected from the group consisting of metals and metal oxides.

In the electric facility 10, an adsorbent, desiccant, an acid scavenger, and the like may be enclosed in the device in order to maintain dielectric purity and device performance.

The adsorbent is preferably one that adsorbs organic substances in the dielectric and decomposition products of the dielectric generated with use. As the adsorbent, for example, activated carbon, activated alumina, silica gel, zeolite, a metal oxide having an adsorption function, a porous substance, and the like may be used, and in particular, zeolite, a metal oxide having an adsorption function, and a porous substance are preferable. The adsorbent may be used singly or in combination of two or more kinds thereof.

Examples of the zeolite include synthetic zeolite having a silica/alumina molar ratio of 5 or more (high-silica synthetic zeolite), synthetic zeolite having a proton (H) as a cation (proton exchange synthetic zeolite), and the like.

Examples of the metal oxide having an adsorption function include $CuO$, $Co_3O_4$, and $MnO_2$.

Examples of the porous substance include a porous substance coated with calcium carbonate.

The desiccant is preferably one that efficiently adsorbs moisture in the dielectric, and for example, calcium, calcium sulfate, particularly DRIERITE®, calcium carbonate, calcium hydride, calcium chloride, potassium carbonate, potassium hydroxide, copper (II) sulfate, calcium oxide, magnesium, magnesium oxide, magnesium sulfate, magnesium perchlorate, sodium, sodium sulfate, aluminum, lithium aluminum hydride, aluminum oxide, activated alumina, montmorillonite, phosphorus pentoxide, silica gel, cellulose filter, and the like are preferable. The desiccant may be used singly or in combination of two or more kinds thereof.

In the electric facility 10 of the present disclosure, the dielectric 14 to be filled in the metal tank 11 includes at least one selected from the group consisting of 1-chloro-2, 3, 3, 3-tetrafluoropropene (hereinafter, also referred to as HCFO-1224 yd) and 1,1,1,4,4,4-hexafluoro-2-butene (hereinafter, also referred to as HFO-1336mzz).

When the electric facility 10 is being used, a high voltage is applied to the conductor member 12, so that the inside of the metal tank 11 has a high temperature. In particular, it is considered that a region near the conductor member 12 tends to have a high temperature. The surface material of the conductor member 12 described above acts as a catalyst for the isomerization reaction of at least one selected from the group consisting of HFO and HCFO to be filled in the metal tank 11 as dielectric(s) 14 under a high-temperature environment depending on the combination of the types of the dielectrics to be filled. It is considered that this allows the isomerization reaction of HFO and HCFO to proceed.

The present inventors have found that when at least one selected from the group consisting of HCFO-1224 yd and HFO-1336mzz is used as the dielectric(s) 14 to be filled in the metal tank 11 and the surface material of the conductor member is a predetermined material, the isomerization reaction is remarkably suppressed as compared with other HCFO and HFO, for example, 1-chloro-3, 3, 3 trifluoropropene (hereinafter, also referred to as HCFO-1233zd) used in Examples described later.

(HCFO-1224yd)

HCFO-1224yd ($CF_3CF=CHCl$) is an olefin having a double bond between carbon atoms. Therefore, the lifetime in the atmosphere is short, and the ozone depletion potential and the global warming potential are small.

HCFO-1224yd is known to have geometric isomers, the boiling point of a Z-isomer of HCFO-1224yd (hereinafter, also referred to as HCFO-1224yd (Z)) is 15° C., and the boiling point of an E-isomer of HCFO-1224yd (hereinafter, also referred to as HCFO-1224yd (E)) is 17° C. A composition of HCFO-1224yd (Z) and HCFO-1224yd (E) is obtained by a known production method, and both may be separated by distillation.

As a dielectric to be filled in the metal tank 11, only one of the Z-isomer or the E-isomer may be used as HCFO-1224yd, or a composition containing both the Z-isomer and the E-isomer may be used.

In a case in which only one of the Z-isomer and the E-isomer is used, HCFO-1224yd (Z) having a lower boiling point is less likely to be liquefied in the electric facility, which is preferable.

In a case in which a composition containing the Z-isomer and the E-isomer is used, it is preferable to use an isomer composition having a high proportion of HCFO-1224yd (Z) in consideration of productivity. In a case in which the isomer composition is used, the mass ratio (Z/E ratio) represented by HCFO-1224yd (Z)/HCFO-1224yd (E) is preferably from 99/1 to 50/50, more preferably from 99/1 to 80/20, and still more preferably from 99/1 to 95/5 in the total mass of HCFO-1224yd filled as a dielectric.

Examples of the method for producing HCFO-1224yd include: (1) a method in which 1,2 dichloro-2, 3,3,3-tetrafluoropropane (hereinafter, also referred to as HCFC-234bb) is subjected to a dehydrochlorination reaction; and (2) a method in which 1,1 dichloro-2, 3,3,3-tetrafluoropropene (hereinafter, also referred to as CFO-1214ya) is subjected to hydrogen reduction.

Hereinafter, each method will be described in detail.

(1) Dehydrochlorination Reaction of HCFC-234bb

HCFC-234bb is brought into contact with a base dissolved in a solvent (that is, a base in a solution state) in a liquid phase to perform a dehydrochlorination reaction of HCFC-234bb. HCFC-234bb may be produced, for example, by reacting 2,3,3,3-tetrafluoropropene (hereinafter, also referred to as HFO-1234yf) with chlorine in a solvent.

(2) Method for Hydrogen Reduction of CFO-1214ya

CFO-1214ya is reduced to HFO-1234yf by reduction using hydrogen in the presence of a catalyst. Then, HCFO-1224yd is obtained as an intermediate of the reduction reaction to HFO-1234yf. In addition, in the reduction reaction to HFO-1234yf, many kinds of fluorine-containing compounds are produced as by-products in addition to HCFO-1224yd. For example, a method is known in which CFO-1214ya is produced by a dehydrofluorination reaction using 3,3-dichloro-1, 1,1,2,2-pentafluoropropane or the like as a raw material in the presence of a phase-transfer catalyst in an alkaline aqueous solution or in the presence of a catalyst such as chromium, iron, copper, activated carbon or the like in a gas phase reaction.

(HFO-1336mzz)

HFO-1336mzz ($CF_3CH=CHCF_3$) is an olefin having a double bond between carbon atoms. Therefore, the lifetime in the atmosphere is short, and the ozone depletion potential and the global warming potential are small.

HFO-1336mzz is known to have geometric isomers, the boiling point of a Z-isomer of HFO-1336mzz (hereinafter, also referred to as HFO-1336mzz (Z)) is 33° C., and the boiling point of an E-isomer of HFO-1336mzz (hereinafter, also referred to as HFO-1336mzz (E)) is 7.5° C. A composition containing HFO-1336mzz (Z) and HFO-1336mzz (E) is obtained by a known production method, and both may be separated by distillation.

As a dielectric to be filled in the metal tank 11, the HFO-1336mzz may include only one of the Z-isomer or the E-isomer, or may include both the Z-isomer and the E-isomer.

In a case in which only one of the Z-isomer or the E-isomer is used, HFO-1336mzz (E) having a lower boiling point is less likely to be liquefied in the electric facility, which is preferable.

A method for producing HFO-1336mzz may be prepared, for example, by contacting $CF_3$—CCl=CCl—$CF_3$ with hydrogen in the presence of a catalyst as disclosed in U.S. Pat. Nos. 7,795,482 and 8,399,721.

HFO-1336mzz may be prepared by contacting $CF_3$—$CHCl_2$ with copper in an amide solvent under the presence of 2, 2'-bipyridine as disclosed in U.S. Pat. No. 8,436,216.

HFO-1336mzz may be prepared by: (1) contacting $CCl_3$—$CF_3$ with hydrogen in the presence of a catalyst containing ruthenium to produce 1316mxx (2,3-dichloro-1, 1,1,4,4,4-hexafluoro-2-butene); (2) contacting 1316mxx with hydrogen in the presence of a catalyst containing copper, nickel, copper-nickel, or copper-palladium to provide E- or Z-1326mxz (1,1,1,4,4,4-hexafluoro-2-chloro-2-butene); (3) contacting 1326mxz with an aqueous solution of an alkali metal hydroxide in the presence of a quaternary alkylammonium salt to provide a composition containing hexafluoro-2-butyne; and (4) contacting hexafluoro-2-butyne with hydrogen and a catalyst (which is conducted sequentially from above (1) to above (4) in this order), which is as disclosed in WO 2015/120250. Other processes than (1) to (4) may be included.

Also, HFO-1336mzz may be prepared by (1) contacting 3,3,3 trifluoro-1 propene with carbon tetrachloride to provide 2,4,4,4-tetrachloro-1,1,1-trifluorobutane; and then (2) contacting 2,4,4,4-Tetrachloro-1,1,1-trifluorobutane, as disclosed in WO 2015/142981.

As dielectric(s) to be filled in the metal tank 11, only one of HCFO-1224yd or HFO-1336mzz may be contained, or both of them may be contained.

As the dielectric(s) to be filled in the metal tank 11, HCFO-1224yd has a small difference in boiling point between the Z form and the E form even when the isomerization reaction has proceeded in the electric facility, and is thus less likely to be liquefied in the electric facility, which is preferable.

A total volume of HCFO-1224yd and HFO-1336mzz filled in the metal tank 11 is preferably 70 vol % or less, 60 vol % or less, 50 vol % or less, 40 vol % or less, 30 vol % or less, 25 vol % or less, 20 vol % or less, 15 vol % or less, 10 vol % or less, or 5 vol % or less with respect to the volume of the entire dielectrics filled in the metal tank 11 from the viewpoint of realizing the condensation temperature required for HCFO-1224yd and HFO-1336mzz to exist only in the gas phase state. The total volume of HCFO-1224yd and HFO-1336mzz is preferably 1 vol % or more, 2 vol % or more, or 3 vol % or more with respect to the volume of the entire dielectrics filled in metal tank 11 from the viewpoint of insulation performance and arc-extinguishing performance.

The dielectrics to be filled in the metal tank 11 may include other dielectric(s) in addition to HCFO-1224yd and HFO-1336mzz. Specific examples of other dielectric(s) will be described below.

Examples of other dielectric(s) include difluoroethylene, trifluoroethylene, 2,3,3,3-tetrafluoro-1-propene, (E)-1, 3,3, 3-tetrafluoropropene, and (Z)-1, 3,3,3-tetrafluoropropene. Among them, (E)-1-chloro-3,3,3-trifluoropropene, 2,3,3,3 tetrafluoro-1-propene, (E)-1, 3,3,3-tetrafluoropropene, and (Z)-1, 3,3,3-tetrafluoropropene are preferable.

However, in a case in which a dielectric having geometric isomers is used as the other dielectric(s), the isomerization reaction easily proceeds as compared with HCFO-1224yd and HFO-1336mzz; therefore, when the filling amount of the other dielectric(s) into the metal tank 11 is large, the influence of the isomerization of the other dielectric(s) on the electric facility becomes a problem. Therefore, the molar ratio of the other dielectric(s) in the dielectrics filled in the metal tank 11 is preferably 30% or less, more preferably 20% or less, still more preferably 10% or less, and particularly preferably 5% or less.

The dielectrics to be filled in the metal tank 11 may contain, as a first trace component, at least one selected from the group consisting of fluorocarbon, chlorofluorocarbon, fluoroolefin, chlorofluoroolefin other than HCFO-1224yd and HFO-1336mzz, chlorofluoroalkyne, methanol, ethanol, acetone, hexane, ethylene, and carbon monoxide.

The fluorocarbon refers to a saturated hydrocarbon compound containing a fluorine atom as a halogen atom but not containing a chlorine atom in the molecule. The fluorocarbon may or may not contain a hydrogen atom in the molecule.

The chlorofluorocarbon refers to a saturated hydrocarbon compound containing a fluorine atom and a chlorine atom as a halogen atom. The chlorofluorocarbon may or may not contain a hydrogen atom in the molecule.

The fluoroolefin refers to an ethylenic hydrocarbon compound containing a fluorine atom as a halogen atom but not containing a chlorine atom in the molecule. The fluoroolefin may or may not contain a hydrogen atom in the molecule.

The chlorofluoroolefin refers to a saturated hydrocarbon compound containing a fluorine atom and a chlorine atom as a halogen atom. The chlorofluoroolefin may or may not contain a hydrogen atom in the molecule.

The chlorofluoroalkyne refers to a saturated hydrocarbon compound containing a fluorine atom and a chlorine atom as a halogen atom. The chlorofluoroalkyne may or may not contain a hydrogen atom in the molecule.

Examples of the fluorocarbon include 1,1,1,2-tetrafluoropropane, 1,1,1,3-tetrafluoropropane, 1,1,1,3,3-pentafluoropropane, 1,1,1,2,2,3,3-heptafluoropropane, tetrafluoromethane, trifluoromethane and fluoroethane.

Examples of the chlorofluorocarbon include 1,3-dichloro-1,1,2,2,3-pentafluoropropane, 2-chloro-1,1,1,2-tetrafluoropropane, 3,3-dichloro-1,1,1,2,2-pentafluoropropane, and chlorotrifluoromethane.

Examples of the fluoroolefin other than HFO-1336mzz include 2,4,4,4 tetrafluoro-1-butene and tetrafluoroethylene.

Examples of the chlorofluoroolefin other than HCFO-1224yd include 1,1-dichloro-2,3,3,3-tetrafluoropropene, 2-chloro-3,3,3-trifluoropropene, (Z)-2-chloro-1,3,3,3-tetrafluoropropene, (E)-2-chloro-1,3,3,3-tetrafluoropropene, and 2-chloro-1,1,3,3,3-pentafluoro-1-propene.

Examples of the chlorofluoroalkyne include 1,1-dichloro-2,3,3,3-tetrafluoropropene and 1-chloro-3,3,3-trifluoro-1-propyne.

Examples of the first trace component include a compound present in the dielectric as a by-product impurity in production of HCFO-1224yd or HFO-1336mzz, and a solvent used in production of HCFO-1224yd or HFO-1336mzz.

In a case in which the dielectrics filled in the metal tank 11 contain the first trace component, a mass-based content of the first trace component is preferably 15,000 ppm or less, and more preferably 10,000 ppm or less with respect to the entire dielectrics (total mass of HCFO-1224yd, HFO-1336mzz and other dielectrics; the same applies hereinafter) filled in the metal tank 11 from the viewpoint of securing further stability.

On the other hand, from the viewpoint that a process of reducing the content of the first trace component may be simplified, the mass-based content of the first trace component is preferably 4 ppm or more, more preferably 50 ppm or more, and still more preferably 100 ppm or more with respect to the entire dielectrics filled in the metal tank 11.

The dielectrics to be filled in the metal tank 11 may contain, as a second trace component, at least one selected from the group consisting of chlorine, hydrogen fluoride, hydrogen chloride, acetic acid, carbonyl fluoride, phosgene, trifluoroacetic acid fluoride, formyl chloride, and chloroform.

In a case in which the second trace component is contained, from the viewpoint of ensuring further stability, a mass-based content of the second trace component is preferably 5000 ppm or less, more preferably 3000 ppm or less, still more preferably 1000 ppm or less, still more preferably 500 ppm or less, still more preferably 250 ppm or less, still more preferably 100 ppm or less, still more preferably 50 ppm or less, and still more preferably 20 ppm or less with respect to the entire dielectrics filled in the metal tank 11.

On the other hand, from the viewpoint that a process of reducing the content of the second trace component may be simplified, the mass-based content of the second trace component is preferably 5 ppm or more, and more preferably 10 ppm or more with respect to the entire dielectrics filled in the metal tank 11.

The inside of the metal tank 11 may be filled with at least one selected from the group consisting of helium, xenon, methane, nitrous oxide, nitrogen, carbon dioxide, air, and oxygen as a diluent gas in addition to the dielectrics.

In a case in which the inside of the metal tank 11 is filled with a diluent gas in addition to the dielectrics, a volume ratio of the dielectrics in a total of the dielectrics and the diluent gas filled in the metal tank 11 is preferably 70 vol % or less, more preferably 60 vol % or less, still more preferably 50 vol % or less, still more preferably 40 vol % or less, still more preferably 30 vol % or less, still more preferably 25 vol % or less, still more preferably 20 vol % or less, still more preferably 15 vol % or less, still more preferably 10 vol % or less, and still more preferably 5 vol % or less from the viewpoint of realizing a condensation temperature required for the dielectrics to exist only in a gas phase state. On the other hand, from the viewpoint of insulation performance and arc-extinguishing performance, the volume ratio of the dielectrics to the total of the dielectrics and the diluent gas filled in the metal tank 11 is preferably 1 vol % or more, more preferably 2 vol % or more, and still more preferably 3 vol % or more.

In a case in which the inside of the metal tank 11 is filled with a diluent gas in addition to the dielectrics, examples of a desirable combination of the dielectrics and the diluent gas include a combination of at least one of (E)-1-chloro-2, 3, 3, 3-tetrafluoropropene and (Z)-1-chloro-2, 3, 3, 3-tetrafluoropropene and at least one selected from the group consisting of air, nitrogen, oxygen, and carbon dioxide.

The electric facility 10 illustrated in FIG. 1 may include various types of facility electrically in series or in parallel along an electric path (electric circuit) including the conductor member 12. Examples of the facility include a switch, a breaker, and a disconnector for cutting an electric path; a transformer, a resistor, a reactor, a capacitor, and the like for changing the voltage of the electric path; and an insulated cable.

The dielectrics and diluent gas filled in the metal tank 11, and hydrogen, helium, $SF_6$, or a mixed gas thereof may be used for insulation inside or outside the facility such as the switch, the breaker, the disconnector, the transformer, the resistor, the reactor, and the capacitor.

In addition, a solid insulator, an insulating oil, a gel-like insulator, or the like may be used for insulation inside or outside the facility. The inside or the outside of the facility may be insulated by a vacuum state.

Examples of the solid insulator include an insulating resin material and the like. Examples of the insulating resin material include a thermoplastic resin and a thermosetting resin. Examples of the thermoplastic resin include vinyl chloride-based, polyester-based, and nylon-based resins. Examples of the thermosetting resin include epoxy-based and urethane-based resins. Examples of the insulating oil include a mineral oil, a vegetable oil, an animal oil, and a fluorine-based oil.

In the electric facility of the present disclosure, a change amount $\Delta Z$ of a peak area of the Z-isomer contained in the dielectrics from an initial value and a change amount $\Delta E$ of a peak area of the E-isomer contained in the dielectrics from an initial value, which are measured by a gas chromatograph after a lapse of 1008 hours under a temperature condition of 160° C., satisfy the following Formulae 1 and 2.

$-1.0$ area $\% \leq \Delta Z \leq 1.0$ area $\%$            Formula 1:

$-1.0$ area $\% \leq \Delta E \leq 1.0$ area $\%$.            Formula 2:

From the viewpoint of further suppressing isomerization of the dielectrics, it is more preferable that the $\Delta Z$ and the $\Delta E$ satisfy the following Formula 1-2 and the following Formula 2-2, and it is still more preferable that the $\Delta Z$ and the $\Delta E$ satisfy the following Formula 1-3 and the following Formula 2-3.

$-0.7$ area $\% \leq \Delta Z \leq 0.7$ area $\%$            Formula 1-2:

$-0.7$ area $\% \leq \Delta E \leq 0.7$ area $\%$            Formula 2-2:

$-0.5$ area $\% \leq \Delta Z \leq 0.5$ area $\%$            Formula 1-3:

$-0.5$ area $\% \leq \Delta E \leq 0.5$ area $\%$            Formula 2-3:

The ΔZ and the ΔE are measured using a gas chromatograph.

As the gas chromatograph, for example, GC system 7890A manufactured by Agilent Technologies may be used, and DB-1 may be used as a GC column.

A method of calculating ΔZ and ΔE will be described below.

Electric facility (hereinafter, referred to as a measurement target) filled with a dielectric to be measured is installed in a thermostatic bath, and then heated to 40° C. A gas sample of a gas phase portion (a gas including dielectrics; the same applies hereinafter) in the measurement target is collected and measured by a gas chromatograph. The areas (the unit is "area %") of the peaks of the Z-isomer contained in the dielectrics and the E-isomer contained in the dielectrics in the chromatogram are calculated, and each peak area is taken as an initial value. The initial value of the area of the peak of the Z-isomer is defined as $Z_0$, and the initial value of the area of the peak of the E-isomer is defined as $E_0$.

The measurement target is heated in a thermostatic bath for 1008 hours under a temperature condition of 160° C., and then a gas sample is collected from a gas phase portion in the measurement target and measured by a gas chromatograph. The area $Z_{1008}$ of the peak of the Z-isomer contained in the dielectrics and the area $E_{1008}$ of the peak of the E-isomer contained in the dielectrics in the chromatogram obtained by measuring the heated gas sample are calculated.

Then, the amount of change ΔZ ($Z_{1008}-Z_0$) in the peak area of the Z-isomer from the initial value and the amount of change ΔE ($E_{1008}-E_0$) in the peak area of the E-isomer from the initial value are calculated.

EXAMPLES

The present disclosure will be described in detail below with reference to examples. Examples 1 and 2 are examples, and Example 3 is a comparative example. However, the present disclosure is not limited to these examples.

Example 1

HCFO-1224yd (purity: 99.4%, Z/E ratio=99.5/0.5) was used as a dielectric.

An inner tube made of Pyrex (registered trademark) whose mass was measured in advance was inserted into a stainless steel (SUS 316) pressure-resistant container (maximum operating temperature: 300° C., maximum operating pressure: 20 MPa) having an internal volume of 200 cc. As metal pieces, one piece of steel (SS400), one piece of copper, and one piece of aluminum (each having a size of 25 mm×30 mm×2 mm) were prepared, and were suspended from the upper part of the inner tube together.

After the pressure-resistant container was sealed, the inside of the container was evacuated. Next, 100 g of the liquefied dielectric was filled in the pressure-resistant container, and the pressure-resistant container was placed in a thermostatic bath. The pressure-resistant container was heated to 40° C., a gas sample of the gas phase portion in the pressure-resistant container was collected and measured by a gas chromatograph, and areas of peaks of HCFO-1224yd (Z) and HCFO-1224yd (E) detected in the chromatogram were calculated. This was used as an initial value at the start (the same applies hereinafter).

Thereafter, the pressure-resistant container was held at 160° C. in a thermostatic bath, a gas sample was collected from the gas phase portion in the pressure-resistant container every 7 days (168 hrs) after 28 days (672 hrs), and the progress of isomerization of HCFO-1224yd was confirmed by a gas chromatograph. Specifically, amounts of change (ΔZ, ΔE; the unit is "area %" (the same applies hereinafter)) in the areas of peaks of HCFO-1224yd (Z) and HCFO-1224yd (E) detected in the chromatogram from the initial values were obtained.

As the gas chromatograph, a GC system 7890A manufactured by Agilent Technologies was used, and 120 m of DB-1 was attached as a GC column.

Figure 2:
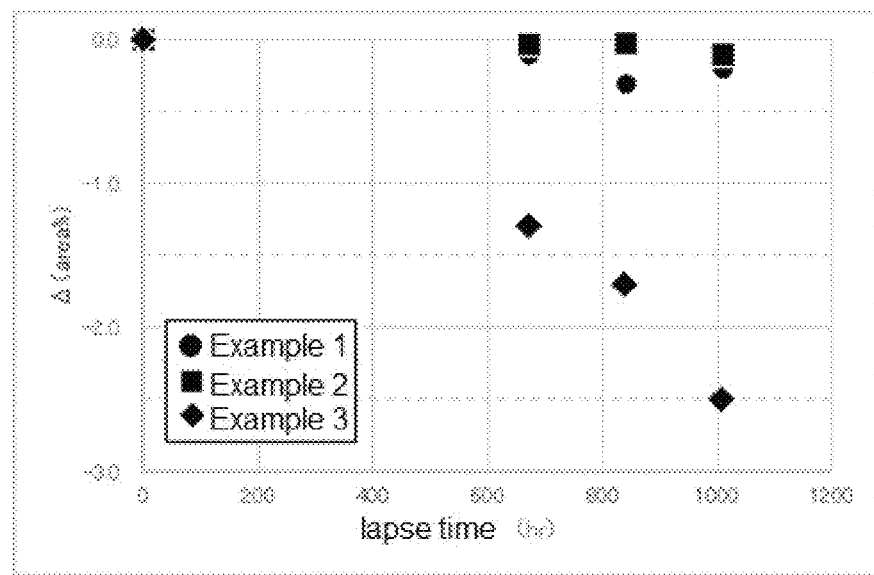
FIG. 2 is a graph showing $\Delta$ ($\Delta Z$) in Example 1 and 2, and $\Delta$ ($\Delta E$) in Example 3.

The results are shown in the following table. ΔZ is also shown in FIG. 2.

Example 2

The same procedure as in Example 1 was carried out except that HFO-1336mzz (purity: 99.9%, Z/E ratio=100/0) was used as a dielectric, and the progress of isomerization of HFO-1336mzz was confirmed by a gas chromatograph. Specifically, amounts of change (ΔZ, ΔE) in the areas of peaks of HFO-1336mzz (Z) and HFO-1336mzz (E) detected in the chromatogram from the initial values were obtained. ΔZ is also shown in FIG. 2.

Example 3

The same procedure as in Example 1 was carried out except that HFO-1233zd (purity: 99.9%, Z/E ratio=0/100) was used as a dielectric, and the progress of isomerization of HFO-1233zd was confirmed by a gas chromatograph. Specifically, amounts of change (ΔZ, ΔE) in the areas of peaks of HFO-1233zd (Z) and HFO-1233zd (E) detected in the chromatogram from the initial values were obtained. ΔE is also shown in FIG. 2.

TABLE 1

| | | Example | | | | | |
|---|---|---|---|---|---|---|---|
| | | Example 1 | | Example 2 | | Example 3 | |
| | | Kind of dielectric | | | | | |
| | | HCFO-1224yd | | HFO-1336mzz | | HCFO-1233zd | |
| | | Change amount of isomer | | | | | |
| | | ΔZ (area %) | ΔE (area %) | ΔZ (area %) | ΔE (area %) | ΔZ (area %) | ΔE (area %) |
| Lapse time (hr) | 0 | 0.0 | 0.0 | 0.0 | 0.0 | 0.0 | 0.0 |
| | 672 | −0.1 | 0.3 | 0.0 | 0.0 | 1.3 | −1.3 |
| | 840 | −0.3 | 0.3 | 0.0 | 0.0 | 1.7 | −1.7 |
| | 1008 | −0.2 | 0.5 | −0.1 | 0.0 | 2.5 | −2.5 |

In Example 1, a decrease in HCFO-1224yd (Z) due to isomerization indicated by ΔZ and an increase in HCFO-1224yd (E) due to isomerization indicated by ΔE were minor. In Example 2, a decrease in HFO-1336mzz (Z) due to isomerization indicated by ΔZ was hardly observed. On the other hand, in Example 3, a decrease in HCFO-1233zd (E) due to isomerization indicated by ΔE and an increase in HCFO-1233zd (Z) due to isomerization indicated by ΔZ were remarkable.

Example 1 shows that isomerization of the dielectric is suppressed even when HCFO-1224yd having a purity of 99.4% is used as the dielectric. Example 2 shows that isomerization of the dielectric is suppressed even when HFO-1336mzz having a purity of 99.9% is used as the dielectric. Therefore, it can be seen that isomerization of the dielectric is suppressed even when the concentrations of HCFO-1224yd and HFO-1336mzz contained in the dielectric are as low as 70 vol % or less, 60 vol % or less, 50 vol % or less, 40 vol % or less, 30 vol % or less, 25 vol % or less, 20 vol % or less, 15 vol % or less, 10 vol % or less, or 5 vol % or less.

The disclosures of Japanese Patent Application No. 2020-177310 filed on Oct. 22, 2020 is incorporated herein by reference in their entirety.

All documents, patent applications, and technical standards described in the present specification are incorporated herein by reference to the same extent as if each individual document, patent application, or technical standard were specifically and individually indicated to be incorporated by reference.

The invention claimed is:

1. An electric facility, comprising:
   a metal tank;
   a conductor member positioned in the metal tank; and
   a dielectric filling the metal tank and comprising at least one selected from a group consisting of 1-chloro-2,3,3,3-tetrafluoropropene and 1,1,1,4,4,4-hexafluoro-2-butene,
   wherein the conductor member has a surface comprising a metal selected from a group consisting of aluminum, copper, silver, tin, zinc iron and chromium or an alloy comprising at least one selected from the group consisting of aluminum, copper silver tin zinc iron and chromium.

2. The electric facility according to claim 1, wherein the dielectric comprises at least one selected from a group consisting of a Z-isomer and an E-isomer of the 1-chloro-2,3,3,3-tetrafluoropropene, and a Z-isomer and an E-isomer of the 1,1,1,4,4,4-hexafluoro-2-butene.

3. The electric facility according to claim 2, wherein the dielectric comprises at least one selected from a group consisting of the Z-isomer of the 1-chloro-2,3,3,3-tetrafluoropropene and the Z-isomer of the 1,1,1,4,4,4-hexafluoro-2-butene.

4. The electric facility according to claim 2, wherein the dielectric comprises the Z-isomer of the 1-chloro-2,3,3,3-tetrafluoropropene and the Z-isomer of the 1,1, 1,4,4,4-hexafluoro-2-butene.

5. The electric facility according to claim 1, wherein the dielectric comprises a Z-isomer and an E-isomer of the 1-chloro-2, 3, 3, 3-tetrafluoropropene, and a mass ratio of the Z-isomer/the E-isomer in a total mass of the 1-chloro-2, 3, 3, 3-tetrafluoropropene is from 99/1 to 50/50.

6. The electric facility according to claim 5, wherein the mass ratio of the Z-isomer/the E-isomer in the total mass of the 1-chloro-2, 3, 3, 3-tetrafluoropropene is from 99/1 to 80/20.

7. The electric facility according to claim 5, wherein the mass ratio of the Z-isomer/the E-isomer in the total mass of the 1-chloro-2, 3, 3, 3-tetrafluoropropene is from 99/1 to 95/5.

8. The electric facility according to claim 1, wherein the electric facility is one of a switch, a breaker, and a disconnector.

9. The electric facility according to claim 1, wherein the surface of the conductor member further comprises a metal oxide selected from a group consisting of zinc oxide, iron oxide, and aluminum oxide.

10. The electric facility according to claim 1, wherein the dielectric satisfies −0.7 area %≤ΔZ≤0.7 area % and −0.7 area %≤ΔE≤0.7 area %.

11. The electric facility according to claim 1, wherein the dielectric satisfies −0.5 area %≤ΔZ≤0.5 area % and −0.5 area %≤ΔE≤0.5 area %.

12. The electric facility according to claim 1, wherein the metal tank includes at least one diluent gas selected from a group consisting of helium, xenon, methane, nitrous oxide, nitrogen, carbon dioxide, air, and oxygen.

13. The electric facility according to claim 12, wherein a volume ratio of the dielectric to a total of the dielectric and the diluent gas is in a range of from 1 to 70 vol %.

14. The electric facility according to claim 12, wherein a volume ratio of the dielectric to a total of the dielectric and the diluent gas is in a range of from 2 to 30 vol %.

15. The electric facility according to claim 12, wherein a volume ratio of the dielectric to a total of the dielectric and the diluent gas is in a range of from 3 to 5 vol %.

16. The electric facility according to claim 1, wherein the dielectric includes at least one selected from a group consisting of (E)-1-chloro-3,3,3-trifluoropropene, difluoroethylene, trifluoroethylene, 2,3,3,3-tetrafluoro-1-propene, (E)-1,3,3,3-tetrafluoropropene, and (Z)-1,3,3,3-tetrafluoropropene.

17. An electric facility, comprising:
   a metal tank;
   a conductor member positioned in the metal tank; and
   a dielectric filling the metal tank and comprising at least one selected from a group consisting of 1-chloro-2, 3, 3, 3-tetrafluoropropene and 1,1, 1,4,4,4-hexafluoro-2-butene,
   wherein the dielectric satisfies −1.0 area %≤ΔZ≤1.0 area % and −1.0 area %≤ΔE≤1.0 area %, where ΔZ is a change amount of a peak area of a Z-isomer in the dielectric from an initial value measured by a gas chromatograph after a lapse of 1008 hours under a temperature condition of 160° C., and ΔE is a change amount of a peak area of an E-isomer in the dielectric from an initial value measured by a gas chromatograph after a lapse of 1008 hours under a temperature condition of 160° C.

* * * * *